(12) United States Patent
Russell (10) Patent No.: US 12,428,295 B2
(45) Date of Patent: Sep. 30, 2025

(54) METHOD OF RECOVERING A HYDROGEN-ENRICHED PRODUCT AND $CO_2$ IN A HYDROGEN PRODUCTION UNIT

(71) Applicant: UOP LLC, Des Plaines, IL (US)

(72) Inventor: Bradley Russell, Fall Branch, TN (US)

(73) Assignee: UOP LLC, Des Plaines, IL (US)

( * ) Notice: Subject to any disclaimer, the term of this patent is extended or adjusted under 35 U.S.C. 154(b) by 493 days.

(21) Appl. No.: 17/806,638

(22) Filed: Jun. 13, 2022

(65) Prior Publication Data

US 2023/0399227 A1 Dec. 14, 2023

(51) Int. Cl.
*C01B 3/24* (2006.01)
*C01B 3/00* (2006.01)
*C01B 3/50* (2006.01)

(52) U.S. Cl.
CPC .............. *C01B 3/24* (2013.01); *C01B 3/0005* (2013.01); *C01B 3/501* (2013.01); *C01B 2203/0205* (2013.01); *C01B 2203/0266* (2013.01); *C01B 2203/0283* (2013.01); *C01B 2203/0405* (2013.01); *C01B 2203/043* (2013.01); *C01B 2203/062* (2013.01); *C01B 2203/148* (2013.01)

(58) Field of Classification Search
CPC ................ C01B 3/00; C01B 3/24; C01B 3/50
See application file for complete search history.

(56) References Cited

U.S. PATENT DOCUMENTS

| | | | |
|---|---|---|---|
| 4,300,009 A | 11/1981 | Haag et al. | |
| 4,992,605 A | 2/1991 | Craig et al. | |
| 6,875,008 B1 | 4/2005 | Martin et al. | |
| 7,999,142 B2 | 8/2011 | Kalnes et al. | |
| 8,021,464 B2 | 9/2011 | Gauthier et al. | |
| 8,039,682 B2 | 10/2011 | McCall et al. | |
| 8,198,492 B2 | 6/2012 | Brady et al. | |
| 8,241,400 B2 * | 8/2012 | Grover ............ | C01B 3/382 95/143 |
| 8,303,930 B2 * | 11/2012 | Chen .............. | C01B 3/48 422/612 |
| 8,742,183 B2 | 6/2014 | McCall et al. | |

(Continued)

FOREIGN PATENT DOCUMENTS

WO 2021175662 A1 9/2021

OTHER PUBLICATIONS

U.S. Appl. No. 17/508,349, entitled Integrated Hydrogen Production and Bio-Renewalbe Conversion Process, filed Oct. 22, 2021.

(Continued)

*Primary Examiner* — Sharon Pregler (57) ABSTRACT

Processes for producing a hydrogen-enriched gas stream are described. A hydrocarbon containing feed is processed in a hydrogen production process unit, and the synthesis gas formed is subjected to a water gas shift reaction. The shifted synthesis gas is sent for processing to recover hydrogen and carbon dioxide. The hydrogen and carbon dioxide recovery processes involve separating a purified hydrogen product stream and a purified carbon dioxide stream from the shifted synthesis stream and recycling synthesis gas to the reforming feed after recovery of $CO_2$ and $H_2$, thereby avoiding carbon slip from the process and lowering the overall carbon intensity.

14 Claims, 5 Drawing Sheets

(56) References Cited

U.S. PATENT DOCUMENTS

| | | |
|---|---|---|
| 8,753,427 B2 * | 6/2014 | Allam ................... C10K 1/32 |
| | | 95/143 |
| 8,865,953 B2 | 10/2014 | Brady et al. |
| 2004/0230085 A1 | 11/2004 | Jakkula et al. |
| 2010/0288123 A1 | 11/2010 | Chen et al. |
| 2012/0056132 A1 | 3/2012 | Allam |
| 2013/0017146 A1 | 1/2013 | Darde et al. |
| 2019/0135626 A1 | 5/2019 | Rafati et al. |
| 2020/0231435 A1 | 7/2020 | Zhou et al. |

OTHER PUBLICATIONS

U.S. Appl. No. 63/220,848, filed Jul. 12, 2021, entitled Method of Recovering Hydrogen and CO2 in a Hydrogen Production Unit.
U.S. Appl. No. 17/508,349, entitled Integrated Hydrogen Production and Bio-Renewable Conversion Process, filed Mar. 29, 2021. (now U.S. Appl. No. 17/508,349).
U.S. Appl. No. 17/451,941, entitled Method of Recovering Hydrogen and CO2 in a Hydrogen Production Unit, filed Mar. 29, 2021. (now U.S. Appl. No. 17/451,941).
International Search Report from corresponding PCT application No. PCT/US2023/024958, mailed Oct. 4, 2023.
Written Opinion from corresponding PCT application No. PCT/US2023/024958, completed Oct. 4, 2023.

\* cited by examiner

METHOD OF RECOVERING A HYDROGEN-ENRICHED PRODUCT AND CO₂ IN A HYDROGEN PRODUCTION UNIT

BACKGROUND

Hydrogen is expected to have significant growth potential because it is a clean-burning fuel. However, hydrogen production is traditionally a significant emitter of $CO_2$, and government regulations and societal pressures are increasingly taxing or penalizing $CO_2$ emissions or incentivizing $CO_2$ capture. Consequently, significant competition to lower the cost of hydrogen production while recovering the byproduct $CO_2$ for subsequent geological sequestration to capture the growing market is anticipated. $CO_2$ can be recovered as a high-pressure gas to be supplied to a pipeline, but often it is produced in liquefied form for easy transport by truck or ship due to the current lack of $CO_2$ pipeline infrastructure in certain areas of the world.

There is increasing interest in minimizing $CO_2$ emissions from hydrogen production processes based on steam reforming, autothermal reforming, partial oxidation, or gasification of hydrocarbon or carbonaceous feedstocks. A method for achieving this objective is to add $CO_2$ capture to the process along with recycle of unconverted carbon-containing components (carbon monoxide and methane) within the process. Ideally, all of the unreacted carbon-containing components (carbon monoxide and methane) are recycled to the reaction section for complete conversion to $CO_2$ and hydrogen, with zero carbon slip to the atmosphere. However, the presence of inert components such as nitrogen and argon in the hydrocarbon or carbonaceous feedstocks or the oxygen feedstock to such processes poses a problem with this approach. These inert components build up in the recycle loop and must be purged from the system, typically as a fuel gas stream. This purge stream also comprises carbon-containing components (carbon monoxide and methane) and results in carbon emissions to the atmosphere. Therefore, a method is needed to purge inert components efficiently and selectively from the process without increasing carbon emissions.

Most existing hydrogen production processes utilize pressure swing adsorption (PSA) to recover high-purity product hydrogen from shifted syngas. The low-pressure tail gas stream from the PSA unit is typically combusted to generate heat for the process. If no stream is sent to a combustor, a purge is required to prevent the build-up of inert gases in the process.

U.S. Pat. No. 8,021,464 describes a process for the combined production of hydrogen and $CO_2$ from a mixture of hydrocarbons which are converted to syngas. The syngas is separated in a PSA unit into a hydrogen-enriched stream and a PSA off gas stream. The PSA off gas is compressed and dried, followed by several successive steps of condensing and separating the $CO_2$-rich condensate with the temperature being reduced at each step, the temperature ranging from ambient to −56° C. However, the process results in a purge stream containing a significant amount of $CO_2$ which must be removed from the process. A permeate module can be used to improve the separation, but at the cost of increased power requirements.

U.S. Pat. No. 8,241,400 describes a process for recovering hydrogen and $CO_2$ from a mixture of hydrocarbons utilizing a system that includes a reformer unit, an optional water gas shift reactor, a PSA unit, and a cryogenic purification unit or a catalytic oxidizer. The PSA unit produces three streams: a high-pressure hydrogen stream, a low-pressure $CO_2$ stream, and a $CH_4$ rich stream which is withdrawn during a $CO_2$ co-purge step and which may be recycled to the reformer unit. Purified $CO_2$ from the $CO_2$ purification unit in the process is used as the co-purge in the PSA unit. The adsorption step is run at a pressure of about 250 psig to about 700 psig. The pressure during the co-purge step is in the range of about 300 psig to about 800 psig, and the $CO_2$ co-purge stream is preferably introduced at a pressure higher than the pressure during the adsorption step.

The use of a second high-pressure feed stream (the $CO_2$ co-purge stream) increases the cost and complexity of the process in U.S. Pat. No. 8,241,400. The necessity of having a segmented adsorber (or two separate vessels) with an isolation valve between the two and an intermediate sidedraw further increases the cost and complexity of the process.

WO 2021/175662 A1 describes a hydrogen production process based on reforming of hydrocarbon feedstocks wherein hydrogen and $CO_2$ are recovered from the process. A rest gas comprising unreacted carbon-containing components is recycled within the process. As noted above, a problem with this approach is the carbon emissions created by purging inert components (argon and/or nitrogen) from the recycle loop.

There is also increasing interest in utilizing sources other than petroleum crude oil for producing fuels as the demand for fuels such as aviation fuel increases worldwide. One source is what has been termed bio-renewable feedstocks. These bio-renewable feedstocks include, but are not limited to, plant oils such as corn, jatropha, camelina, rapeseed, canola, soybean and algal oils, animal fats such as tallow, fish oils, and various waste streams such as yellow and brown greases and sewage sludge. The common feature of these feedstocks is that they are composed of mono- di- and tri-glycerides, free fatty acids (FFA). Another class of compounds appropriate for these processes is fatty acid alkyl esters (FAAE), such as fatty acid methyl ester (FAME) or fatty acid ethyl ester (FAEE). These types of compounds contain aliphatic carbon chains generally having from about 8 to about 24 carbon atoms. The aliphatic carbon chains in the glycerides, FFAs, or FAAEs can be saturated or mono-, di- or poly-unsaturated. Most of the glycerides in the bio-renewable feed stocks will be triglycerides, but some of the glycerides in the bio-renewable feedstock may be monoglycerides or diglycerides. The monoglycerides and diglycerides can be processed along with the triglycerides.

There are reports disclosing the production of hydrocarbons from bio-based oils. For example, U.S. Pat. No. 4,300,009 discloses the use of crystalline aluminosilicate zeolites to convert plant oils such as corn oil to hydrocarbons such as gasoline and chemicals such as para-xylene. U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

Therefore, there is a need for improved hydrogen production processes with minimal carbon intensity.

DETAILED DESCRIPTION

Various processes for hydrogen production have been developed. Some of the processes involve reforming a hydrocarbon containing feed, subjecting the synthesis gas formed to a water gas shift reaction, and recovering hydrogen and carbon dioxide. The hydrogen recovery and carbon dioxide processes involve recovering a purified hydrogen product stream from the shifted synthesis gas stream. The hydrogen recovery process also results in the production of $CO_2$.

Figure 1:
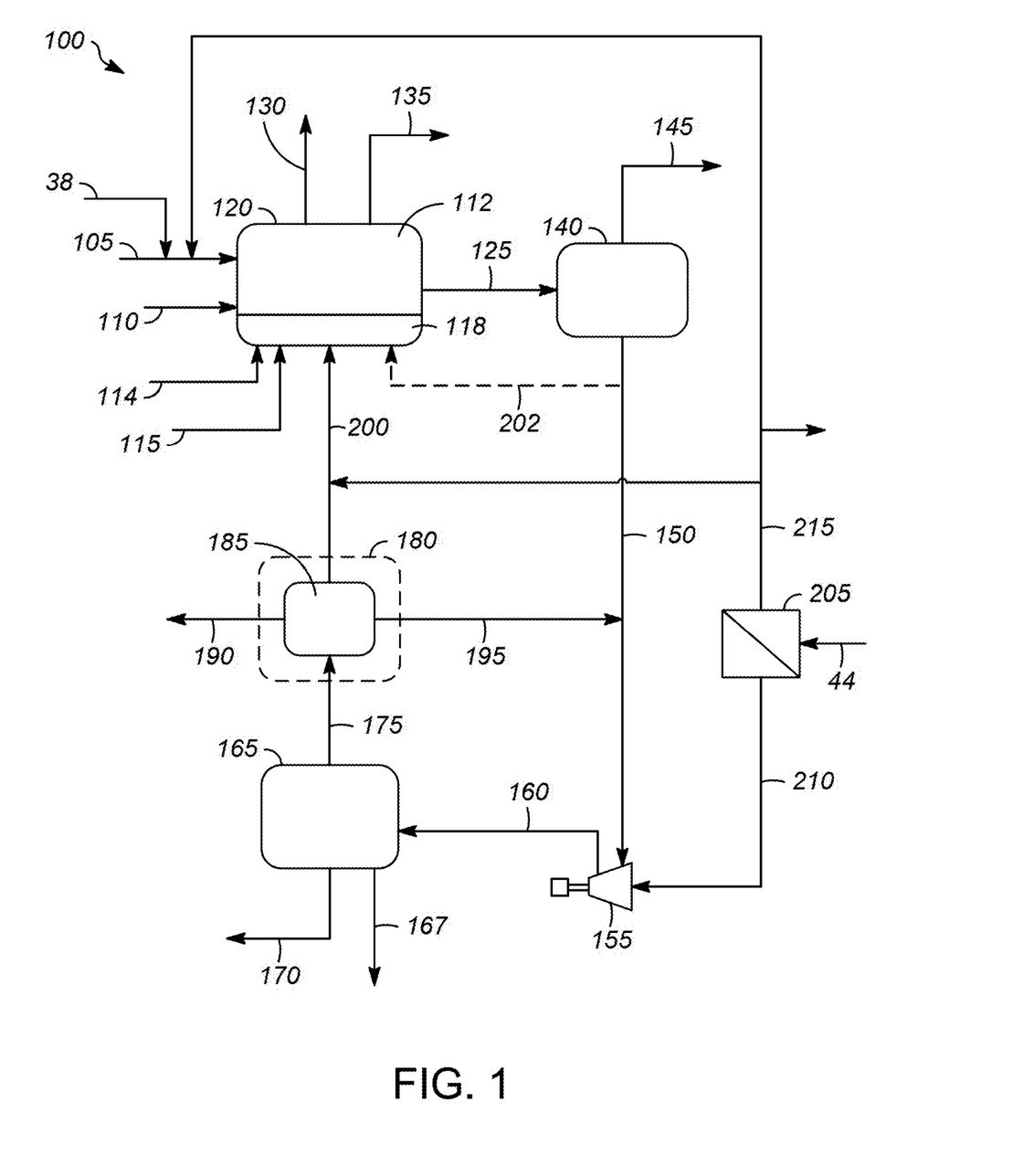
FIG. 1 is an illustration of a low carbon-intensity process for producing a hydrogen stream from a hydrogen production process.

It is desirable to minimize the carbon intensity of these processes. One low carbon-intensity scheme is shown in FIG. 1. In this configuration, purge gas from a bio-renewable conversion process is separated in a membrane separation unit into a hydrogen-rich permeate stream, which can be used for fuel gas in the steam reforming process, and a hydrogen-depleted, carbon-enriched residue stream, which can be used for supplemental reforming feed. This process reduces the amount of natural gas feed needed and the fuel consumption in the steam reforming process, resulting in lower carbon emissions. The shifted syngas is separated in a two-stage PSA system into $CO_2$ and $H_2$ products. The second-stage hydrogen recovery is adjusted to provide enough hydrogen-rich fuel gas to satisfy the steam reforming furnace duty, thereby avoiding direct firing of natural gas.

FIG. 1 illustrates one embodiment of a hydrogen production process 100 incorporating the three-product PSA system. Additional information regarding this process can be found in U.S. application Ser. No. 17/508,349, filed Oct. 22, 2021, US Provisional Application Nos. 63/220,848, filed Jul. 12, 2021, 63/167,343, filed Mar. 29, 2021, and 63/167,341, filed Mar. 29, 2021, each of which is incorporated herein by reference in its entirety.

Natural gas feed 105 and water 110 are sent to the reaction section 112 of the steam reforming process unit 120, and assist fuel gas 114 and air 115 are sent to the furnace 118 in the steam reforming process unit 120. Other feed streams comprising hydrocarbons could be used instead of natural gas.

The steam reforming and water-gas shift reactions produce an effluent stream 125 comprising hydrogen, $CO_2$, water and at least one of methane, carbon monoxide, and nitrogen. Flue gas stream 130 and steam stream 135 also exit the steam reforming process unit 120.

Effluent stream 125 has a temperature of or about 30° C. to about 50° C. (after heat recovery and cooling in the steam reforming process), and a pressure of about 2,000 to about 3,000 kPa. Effluent stream 125 is sent to the hydrogen PSA unit 140 where it is separated into a high purity hydrogen stream 145 enriched in hydrogen and a hydrogen depleted tail gas stream 150 comprising a portion of the hydrogen, the $CO_2$, the water, and at least a portion of the at least one of the methane, carbon monoxide, and nitrogen.

The hydrogen depleted tail gas stream 150 is sent to compressor 155 where it is compressed from a pressure in the range of about 110 kPa to about 200 kPa to a pressure in the range of about 3,000 kPa to about 6,000 kPa.

Compressed tail gas stream 160 is sent to a $CO_2$ recovery unit 165 where it is dried to remove water stream 167, cooled to a temperature of about −20° C. to about −50° C., and separated into a bottoms stream 170 and an overhead stream 175. The bottoms stream 170 comprising liquid $CO_2$ is recovered.

The overhead stream 175 is sent to the three-product PSA system 180 comprising a three-product PSA unit 185 where it is separated into three streams. A high-pressure hydrogen stream 190 is recovered. All or a portion of high-pressure hydrogen stream 190 can be sent to the bio-renewable conversion process and combined with a make-up hydrogen stream for the bio-renewable conversion process. A low-pressure $CO_2$ stream 195 is recycled to the compressor 155.

Intermediate pressure vent gas stream 200 comprising at least a portion of the at least one of the methane, carbon monoxide, and nitrogen and a small amount of hydrogen (e.g., less than about 20%, or about 10% to about 20%) is sent to the steam reforming process unit 120 as fuel.

The purge gas stream comprising hydrogen 44 from the bio-renewable conversion process is sent to a membrane separation unit 205 where it is separated into a permeate stream 210 comprising hydrogen and $CO_2$, and a residue stream 215 comprising at least one of methane, ethane, propane, C4+ hydrocarbons and carbon monoxide. The permeate stream 210 is sent to the compressor 155 and on to the $CO_2$ recovery system 165 and the three-product PSA system 180 to recover the hydrogen and $CO_2$ in the permeate stream 210. In one embodiment, all or a portion of the residue stream 215 is mixed with the intermediate pressure vent gas stream 200 and sent to the furnace 118 of the steam reforming process unit 120. In another embodiment, all or a portion of the residue stream 215 can be mixed with the natural gas feed 105 and sent to the steam reforming process unit 120. When the hydrogen processing unit is an autothermal reforming unit with an optional gas heated reformer, a gasification unit, or a partial oxidation unit, all or a portion of the residue stream 215 can be mixed with the feed stream comprising hydrocarbons and partially oxidized in the autothermal reforming unit, the gasification unit, or the partial oxidation unit. In still another embodiment, all or a portion of the residue stream 215 can be returned to the bio-renewable hydrocarbon production process for recovery of the propane and/or the $C_{4+}$ hydrocarbons.

Bypass line 202 sends the hydrogen depleted tail gas stream 150 to the furnace in the steam reforming process unit for combustion. This allows the steam reforming process unit to continue operating without recovery of $CO_2$ in the event of a problem with the compressor 155, the $CO_2$ recovery unit 165, or the three-product PSA system 180.

One downside to this approach is that all of the carbon slip from the steam reforming process (methane and CO) is burned in the furnace, resulting in some fossil-fuel based $CO_2$ emissions. This leads to constraints on the steam reforming process design that minimize carbon slip (e.g., lower operating pressure, high steam: carbon ratio, two-stage water-gas shift, etc.), resulting in a less-than-optimal steam reforming process conditions and higher cost. Therefore, there is a need to improve the process configuration to achieve lower carbon intensity with a more efficient steam reforming design.

The present processes solve this problem by recycling synthesis gas to the reforming feed after recovery of $CO_2$ and $H_2$, thereby avoiding carbon slip and lowering the overall carbon intensity. As a result, previous constraints on the reforming process are removed. One feature of the design is the selective rejection of inert components (nitrogen and/or argon) in the PSA hydrogen unit, thereby avoiding build-up of inert gases in the recycle loop.

One aspect of the invention is a method for producing a hydrogen-enriched gas stream. In one embodiment, the method comprises: processing a feed stream comprising hydrocarbons (such as natural gas, liquefied petroleum gas, or naphtha) or a carbonaceous feedstock (such as coal, petroleum coke, or biomass) in a hydrogen production process unit to produce a synthesis gas mixture comprising hydrogen, carbon monoxide, methane, water, and an inert gas; performing a water-gas-shift process on the synthesis gas mixture to form shifted synthesis gas comprising carbon dioxide; performing a hydrogen pressure swing adsorption (PSA) separation process and a carbon dioxide separation process on the shifted synthesis gas to form a high-pressure hydrogen product stream comprising the hydrogen, an inert gas-enriched off gas stream from the hydrogen separation process comprising the inert gas and depleted of carbon-containing components, a carbon dioxide product stream comprising carbon dioxide, and a carbon-enriched off gas stream comprising the carbon monoxide and the methane, the hydrogen PSA process comprising a three-product PSA system comprising a three-product PSA unit or at least two PSA units; and recycling the carbon-enriched off gas stream to the hydrogen production process unit.

A feed stream comprising hydrocarbons or a carbonaceous feedstock is processed in a hydrogen production process unit. Suitable hydrogen production processes include, but are not limited to, a steam reforming unit with an optional gas heated reformer, or an autothermal reforming unit with an optional gas heated reformer, or a gasification unit, or a partial oxidation (POX) unit, or combinations thereof.

The synthesis gas mixture produced in the hydrogen production process comprises hydrogen, carbon monoxide, methane, water, and inert gases such as nitrogen and argon. The synthesis gas mixture undergoes a water-gas-shift reaction to convert carbon monoxide to carbon dioxide and additional hydrogen.

The hydrogen concentration in the synthesis gas mixture is generally in the range of about 50 mol % to about 80 mol %. For example, the hydrogen concentration in a steam methane reforming plant shifted syngas is about 60 mol % to about 80 mol %, while the hydrogen concentration in a POX reactor is about 50 mol % to about 70 mol %.

The shifted synthesis gas is separated in a hydrogen PSA separation process and a carbon dioxide separation process.

The hydrogen PSA separation process and carbon dioxide separation process form a high-pressure hydrogen product stream comprising the hydrogen, an inert gas-enriched off gas stream from the hydrogen separation process comprising the inert gas and depleted of carbon-containing components, a carbon dioxide product stream comprising carbon dioxide, and a carbon-enriched off gas stream comprising the carbon monoxide and the methane. The term "inert-enriched off gas stream" means that the stream has at least three times as much (mole %) inert gas (e.g., nitrogen and argon) as the incoming shifted synthesis gas (mole %), and typically in the range of three to eight times as much as the shifted synthesis gas. The term "carbon-enriched off gas stream" means the stream has at least five times as much (mole %) carbon monoxide and methane in the shifted synthesis gas (mole %), and typically five to fifteen times as much.

The temperature of the incoming feed gas mixture to the hydrogen and $CO_2$ recovery system is typically in the range of about 20° C. to about 60° C., or about 30° C. to about 50° C., or about 40° C. (or any combination of temperature ranges).

The high-pressure hydrogen product stream and the carbon dioxide product stream are recovered. The high-pressure hydrogen product stream typically comprises greater than 99.0 mol % hydrogen, or greater than 99.9 mol %, or greater than 99.99 mol %. The carbon dioxide product stream typically comprises greater than 95 mol % carbon dioxide, or greater than 99.0 mol %, or greater than 99.9 mol %.

The inert gas-enriched off gas stream is enriched in inert gases, such as nitrogen and argon, and depleted of carbon-containing components, such as carbon dioxide, carbon monoxide, and methane. It also contains hydrogen and can be burned as fuel in the hydrogen production process or elsewhere in the plant.

The carbon-enriched off gas stream is recycled to the hydrogen production process unit to be used as at least a portion of the feed for the hydrogen processing unit.

The amount of the carbon-enriched off gas stream that is recycled to the hydrogen production process unit may comprise less than 80% of the total amount of the carbon-enriched off gas stream and the inert gas-enriched off gas stream, or less than 70%, or less than 60%, or less than 50%, or less than 40%.

The order of the separation processes does not matter; the hydrogen PSA separation can be first and the carbon dioxide separation second, or the carbon dioxide separation can be first and the hydrogen PSA separation can be second.

When the shifted synthesis gas is introduced into the hydrogen PSA separation process first, the shifted synthesis gas is introduced into the three-product PSA system to form the high-pressure hydrogen product stream, the inert gas-enriched off gas stream, and a low-pressure hydrogen-depleted tail gas stream. The low-pressure hydrogen-depleted tail gas stream is then introduced into the carbon dioxide recovery system to form the carbon dioxide product stream and the carbon-enriched off gas stream.

When the shifted synthesis gas is introduced into the carbon dioxide recovery system first, the carbon dioxide product stream and a carbon dioxide-depleted stream are formed. The carbon dioxide-depleted stream is then introduced into the three product PSA system to form the high-pressure hydrogen stream, the inert-enriched off gas stream, and the carbon-enriched off gas stream.

The carbon dioxide recovery system can be any suitable recovery system known to those of skill in the art. Suitable carbon dioxide recovery systems include, but are not limited to, amine separation units, cryogenic separation units, carbon dioxide PSA units, or combinations thereof.

The hydrogen PSA separation process comprises a three-product PSA system. The three-product PSA system comprises a three-product PSA unit or at least two PSA units.

The three-product PSA unit comprises a PSA adsorption vessel. There are generally at least six vessels, and typically eight to fourteen vessels. The vessels comprise one or more adsorbent layers, generally one to five, and typically two to three. The percentage of the bed for an adsorption layer is typically between 10% and 100%. Different layers of adsorbent have different selectivity for the components in the feed stream, as is known to those skilled in the art. For example, with a hydrogen production process and recovery of $CO_2$, some layers contain adsorbent that is for selective adsorption of $CO_2$ relative to methane, carbon monoxide, nitrogen, argon, and hydrogen, including, but not limited to, layers of activated alumina, silica gel, and sodium Y zeolite. Other layers contain adsorbent that is for selective adsorption of $CO_2$, methane, carbon monoxide, nitrogen, and argon relative to hydrogen, including, but not limited to, layers of activated carbon, silica gel, and molecular sieve zeolite (e.g., 5A or sodium X zeolite). Those of skill in the art will appreciate that other zeolites could be used and will know how to select appropriate adsorbents.

There is a first opening at one end of the vessel, and a second opening at the opposite end. For convenience, the ends will be referred to as the top and the bottom of the vessel. The first opening at the bottom is selectively connected to a high-pressure feed gas inlet line, and a low-pressure tail gas outlet line. The second opening at the top of the vessel is selectively connected to a high-pressure product outlet line, an intermediate pressure vent gas outlet line, and a low-pressure purge gas inlet line.

The feed gas enters at high pressure through the first opening at the bottom of the vessel, and a high-pressure, co-current adsorption and product removal step takes place with the product exiting the vessel at high pressure through the second opening at the top of the vessel. There is at least one co-current depressurization step, and then an intermediate pressure co-current depressurization and vent gas removal step. The second stream is removed through the opening at the top of the vessel at a second pressure. There is a counter-current blowdown step and a counter-current purge step. The purge gas enters through the opening at the top of the vessel at low pressure. The $CO_2$ can be removed at low pressure through the opening at the bottom of the vessel during either or both of the counter-current blowdown step and the counter-current purge step. There is at least one counter-current re-pressurization step following the counter-current purge and tail gas removal step.

The three-product PSA unit is described in more detail in, for example, U.S. application Ser. No. 17/451,935, filed Oct. 22, 2021, which is incorporated herein by reference in its entirety.

Alternatively, the three-product separation system could be at least two PSA units. In this case, there are at least two PSA units in series. The shifted synthesis gas is introduced into the first PSA unit to form a carbon component-enriched tail gas stream enriched in carbon dioxide, carbon monoxide, and methane, and a hydrogen-enriched intermediate stream that is also enriched in inert components (nitrogen and/or argon). The hydrogen-enriched intermediate stream is introduced into the second PSA unit to form the high-pressure hydrogen product stream and the inert-enriched off gas stream. The carbon component-enriched tail gas stream is then introduced into the carbon dioxide recovery system.

The three-product PSA system comprising at least two PSA units is further described in, for example, U.S. application Ser. No. 17/508,349, filed Oct. 22, 2021, which is incorporated herein by reference in its entirety.

When the hydrogen PSA separation is first and the three-product PSA system comprises a three-product PSA unit, the shifted synthesis gas is introduced into the three-product PSA unit to form the high-pressure hydrogen product stream, the inert gas-enriched off gas stream, and the hydrogen-depleted tail gas stream. The hydrogen-depleted tail gas stream is then introduced into the carbon dioxide recovery system and separated into the carbon dioxide product stream and the carbon-enriched off gas stream.

When the hydrogen PSA separation is first and the three-product PSA system comprises at least two two-product PSA units, the shifted synthesis gas is introduced into a first PSA unit to form a carbon component-enriched tail gas stream enriched in carbon dioxide, carbon monoxide, and methane, and a hydrogen-enriched intermediate stream that is also enriched in inert components (nitrogen and/or argon). The hydrogen-enriched intermediate stream is introduced into a second PSA unit to form the high-pressure hydrogen product stream and the inert-enriched off gas stream. The carbon component-enriched tail gas stream is then introduced into the carbon dioxide recovery system.

About 70% to 90% of the hydrogen in the synthesis gas mixture to the hydrogen PSA system is typically recovered in the high-pressure product stream, and in some cases, the high-pressure hydrogen stream is substantially free of $CO_2$, methane, carbon monoxide, nitrogen, and argon. It typically contains less than about 1% of the $CO_2$ relative to the feed gas mixture, or less than about 0.1%, or less than about 0.01%. It typically contains less than about 10% of the methane, carbon monoxide, nitrogen, and argon relative to the feed gas mixture, or less than about 5%, or less than about 2%, or less than about 1%, or less than about 0.1%. The high-pressure product stream is typically removed at a high pressure in the range of about 1,000 to about 6,000 kPa, or about 2,000 kPa to about 5,000 kPa, or about 2,500 kPa to about 4,500 kPa.

The hydrogen-depleted tail gas stream is typically removed at a low pressure in the range of about 50 kPa to about 250 kPa, or about 100 kPa to about 200 kPa.

The hydrogen-depleted tail gas stream typically contains about 95% to 100% of the $CO_2$ in the feed gas mixture. It typically contains about 10% of the hydrogen relative to the feed gas mixture (e.g., about 5% to about 15%), and about 40% of the methane, carbon monoxide, nitrogen, and argon relative to the feed (e.g., about 20% to about 60%).

The inert gas-enriched stream from a three-product PSA unit is removed at an intermediate pressure between the high pressure and the low pressure, the intermediate pressure is much closer to the low pressure than to the high pressure, typically within about 400 kPa of the low pressure, or 300 kPa, or 200 kPa. Typically, the intermediate pressure product stream is removed at a pressure in the range of about 150 kPa to about 450 kPa, or about 250 kPa to about 350 kPa. Although there is some overlap between the intermediate pressure range and the low-pressure range, it is understood that in a particular case, the low pressure will be lower than the intermediate pressure.

In some embodiments, the carbon-enriched off gas stream can be introduced into a membrane separation unit to form a permeate stream enriched in hydrogen (e.g., greater than 80% of the hydrogen in the carbon-enriched off gas stream to the membrane separation unit is recovered in the permeate stream, or greater than 90%, or greater than 95%) and a residue stream enriched in carbon monoxide and methane (e.g., greater than 70% of the carbon monoxide and greater than 70% of the methane in the carbon-enriched off gas stream to the membrane separation unit are recovered in the residue stream, or greater than 80%, or greater than 90%). In this arrangement, recycling the carbon-enriched off gas stream to the hydrogen production process unit comprises recycling the residue stream to the hydrogen production process unit. The permeate stream can be optionally combined with the inert gas-enriched stream.

When the carbon dioxide separation process is first, the shifted synthesis gas is introduced into the carbon dioxide recovery system to form the carbon dioxide product stream and a carbon dioxide-depleted stream. The carbon dioxide-depleted stream is introduced into the three product PSA system to form the high-pressure hydrogen stream, the inert-enriched off gas stream, and the carbon-enriched off gas stream.

When the three-product PSA system comprises a three-product PSA unit, the carbon dioxide-depleted stream is introduced into the three-product PSA unit to form the high-pressure hydrogen product stream, the inert gas-enriched off gas stream, and the carbon-enriched off gas stream.

When the three-product PSA system comprises at least two PSA units, the carbon dioxide-depleted stream is introduced into the first PSA unit to form the carbon-enriched off gas stream, and a hydrogen-enriched intermediate stream that is also enriched in inert components (nitrogen and/or argon). The hydrogen-enriched intermediate stream is introduced into the second PSA unit to form the high-pressure hydrogen product stream and the inert-enriched off gas stream.

In some embodiments, the carbon-enriched off gas stream is introduced into a membrane separation unit to form a permeate stream enriched in hydrogen and a residue stream enriched in carbon monoxide and methane. In this case, recycling the carbon-enriched off gas stream to the hydrogen production process unit comprises recycling the residue stream to the hydrogen production process unit. The permeate stream can optionally be combined with the inert gas-enriched stream.

The process for producing the hydrogen-enriched gas stream can be integrated with a bio-renewable conversion process for making a hydrocarbon product from a bio-renewable feedstock, which will be discussed in more detail below. In this case, a purge gas stream comprising hydrogen from the bio-renewable conversion process can be introduced to the membrane separation unit. In addition, at least a portion of the feed stream to the hydrogen production process may comprise a hydrocarbon-containing stream from the bio-renewable conversion process.

Another aspect of the invention comprises a process for producing a hydrogen-enriched gas stream. In one embodiment, the process comprises: processing a feed stream comprising hydrocarbons or a carbonaceous feedstock in a hydrogen production process unit to produce a synthesis gas mixture comprising hydrogen, carbon monoxide, methane, water, and an inert gas; performing a water-gas-shift process on the synthesis gas mixture to form shifted synthesis gas comprising carbon dioxide; performing a hydrogen pressure swing adsorption (PSA) separation process and a carbon dioxide separation process on the shifted synthesis gas to form a high-pressure hydrogen product stream comprising the hydrogen, an inert gas-enriched off gas stream from the hydrogen separation process comprising the inert gas and depleted of carbon-containing components, a carbon dioxide product stream comprising carbon dioxide, and a carbon-enriched off gas stream comprising the carbon monoxide and the methane, the hydrogen PSA process comprising a three-product PSA system comprising a three-product PSA unit or at least two PSA units; and recycling the carbon-enriched off gas stream to the hydrogen production process unit; wherein the carbon dioxide recovery system comprises an amine separation unit, or a cryogenic separation unit, or a carbon dioxide PSA unit, or combinations thereof, and wherein performing the hydrogen PSA separation process and the carbon dioxide separation process comprises: introducing the shifted synthesis gas into the three-product PSA system to form the high-pressure hydrogen product stream, the inert gas-enriched off gas stream, and a hydrogen depleted tail gas stream; and introducing the hydrogen depleted tail gas stream into a carbon dioxide recovery system to form the carbon dioxide product stream and the carbon-enriched off gas stream; or introducing the shifted synthesis gas into the carbon dioxide recovery system to form the carbon dioxide product stream and a carbon dioxide-depleted stream; and introducing the carbon dioxide-depleted stream into the three product PSA system to form the high-pressure hydrogen stream, the inert-enriched off gas stream, and the carbon-enriched off gas stream.

In some embodiments, performing the hydrogen PSA separation process and the carbon dioxide separation process comprises: introducing the shifted synthesis gas into the three-product PSA system to form the high-pressure hydrogen product stream, the inert gas-enriched off gas stream, and a hydrogen depleted tail gas stream; and introducing the hydrogen depleted tail gas stream into a carbon dioxide recovery system to form the carbon dioxide product stream and the carbon-enriched off gas stream.

In some embodiments, the process further comprises: introducing the carbon-enriched off gas stream into a membrane separation unit to form a permeate stream enriched in hydrogen and a residue stream enriched in carbon monoxide and methane; optionally combining the permeate stream with the inert gas-enriched stream; and wherein recycling the carbon-enriched off gas stream to the hydrogen production process unit comprises recycling the residue stream to the hydrogen production process unit.

In some embodiments, performing the PSA separation process and the carbon dioxide separation process comprises: introducing the shifted synthesis gas into the carbon dioxide recovery system to form the carbon dioxide product stream and a carbon dioxide-depleted stream; and introducing the carbon dioxide-depleted stream into the three product PSA system to form the high-pressure hydrogen stream, the inert-enriched off gas stream, and the carbon-enriched off gas stream.

In some embodiments, the process further comprises: introducing the carbon-enriched off gas stream into a membrane separation unit to form a permeate stream enriched in hydrogen and a residue stream enriched in carbon monoxide and methane; optionally combining the permeate stream with the inert gas-enriched stream; and wherein recycling the carbon-enriched off gas stream to the hydrogen production process unit comprises recycling the residue stream to the hydrogen production process unit.

Figure 2:
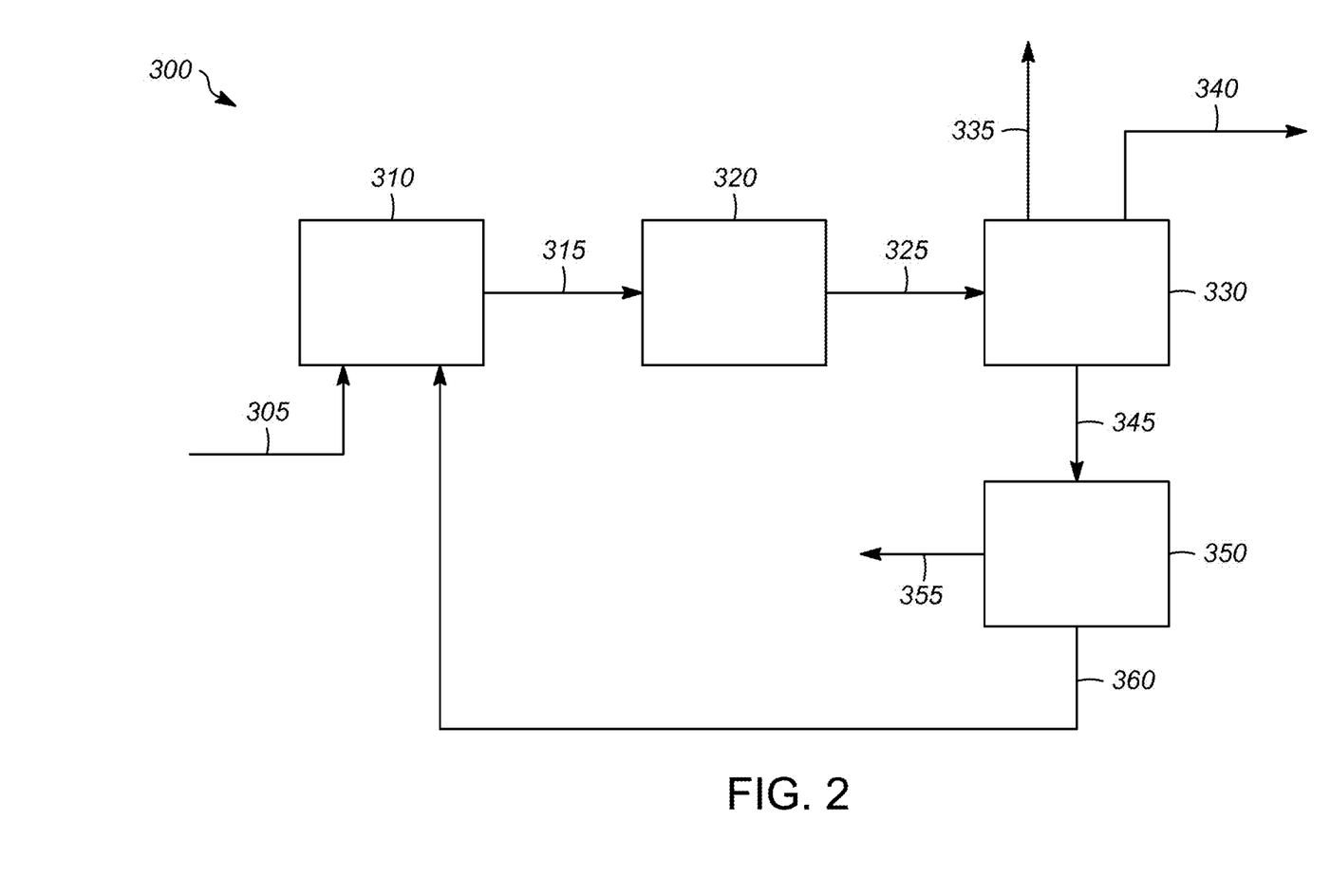
FIG. 2 is an illustration of one embodiment of a process of producing a hydrogen stream and a $CO_2$ stream from a hydrogen production process unit of the present invention.

FIG. 2 is an illustration of a process 300 for producing a hydrogen-enriched gas stream in which the hydrogen separation takes place before the carbon dioxide separation. The feed stream 305 is introduced into the hydrogen production process unit 310 where it is converted into synthesis gas. The synthesis gas mixture comprises hydrogen, carbon monoxide, methane, water, and inert gas.

The synthesis gas stream 315 comprising the synthesis gas mixture is sent to the water gas shift reactor 320 to convert carbon monoxide to carbon dioxide.

The shifted synthesis gas stream 325 is sent to the hydrogen PSA system 330. The hydrogen PSA system 330 can be either a three-product PSA unit or at least two PSA units as discussed above.

The hydrogen PSA system 330 produces a high-pressure hydrogen product stream 335, an inert gas-enriched off gas stream 340, and a hydrogen-depleted tail gas stream 345. The high-pressure hydrogen product stream 335 is recovered. The inert gas-enriched off gas stream 340 is enriched in inert gases, such as nitrogen and argon, and depleted of carbon-containing components, such as carbon dioxide, carbon monoxide, and methane. The inert gas-enriched off gas stream 340 also contains hydrogen and can be sent to be used as fuel in the hydrogen production process unit or elsewhere. The hydrogen-depleted tail gas stream 345 is enriched in carbon dioxide, carbon monoxide, and methane.

The hydrogen-depleted tail gas stream 345 is sent to the carbon dioxide recovery system 350 where it is separated into a carbon dioxide product stream 355 and a carbon-enriched off gas stream 360. The carbon dioxide product stream 355 is recovered.

The carbon-enriched off gas stream 360 is recycled to the hydrogen production process unit 310.

Figure 3:
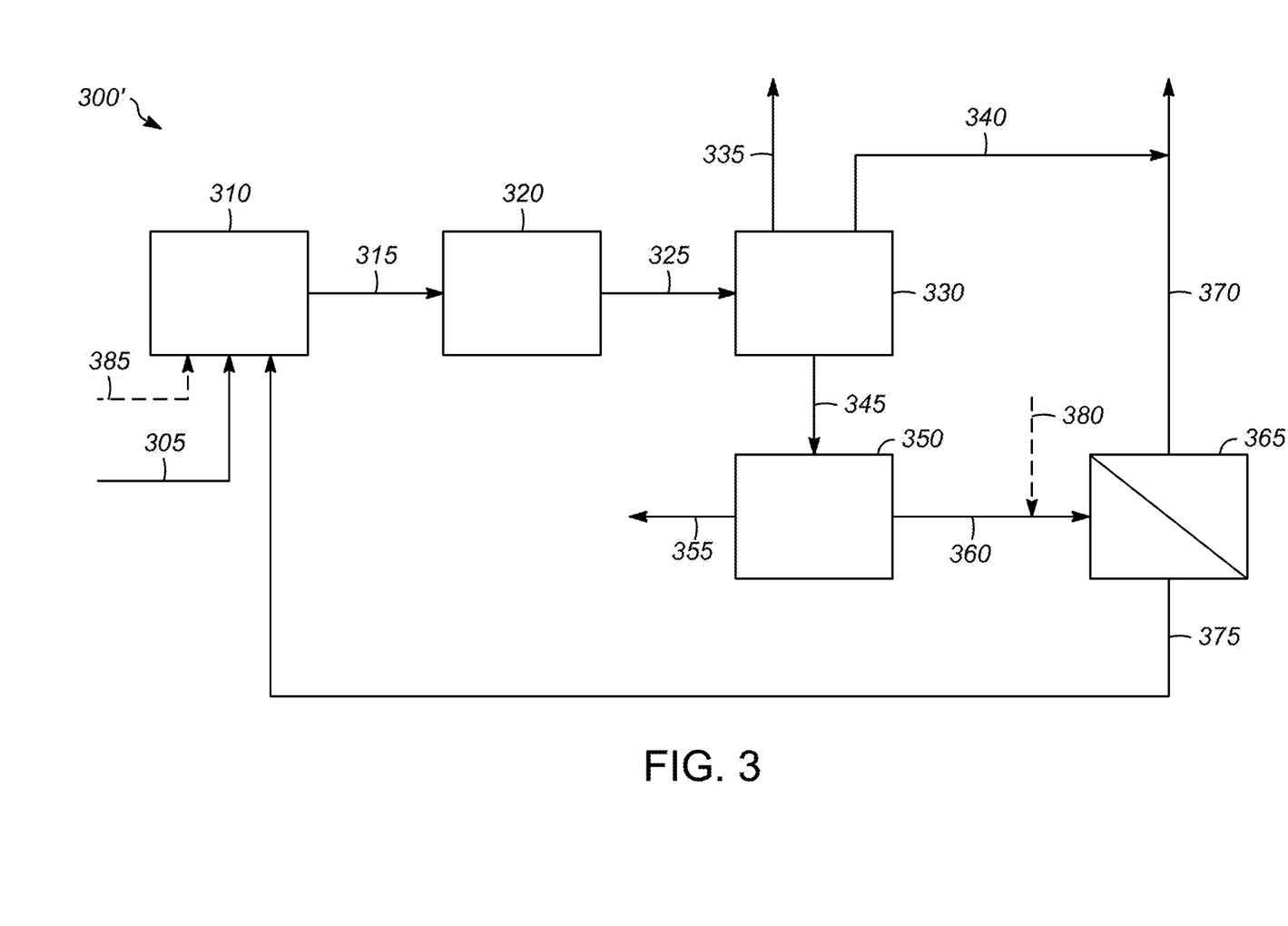
FIG. 3 is an illustration of another embodiment of the process of FIG. 2.

FIG. 3 illustrates a process 300' in which the carbon-enriched off gas stream 360 undergoes further separation.

The carbon-enriched off gas stream 360 is sent to a membrane separation unit 365 where it is separated into a permeate stream 370 enriched in hydrogen and a residue stream 375 enriched in carbon monoxide and methane. The permeate stream 370 can optionally be combined with the inert gas-enriched off gas stream 340. The residue stream 375 enriched in carbon monoxide and methane is recycled to the hydrogen production process unit 310.

If the hydrogen production process is integrated with a bio-renewable conversion process for making a hydrocarbon product from a bio-renewable feedstock, a purge gas stream 380 comprising hydrogen from bio-renewable conversion process can be introduced into the membrane separation unit 365. Additionally, a hydrocarbon-containing stream 385 from the bio-renewable conversion process (not shown) can be used as at least a portion of the feed to the hydrogen production process unit 310.

Figure 4:
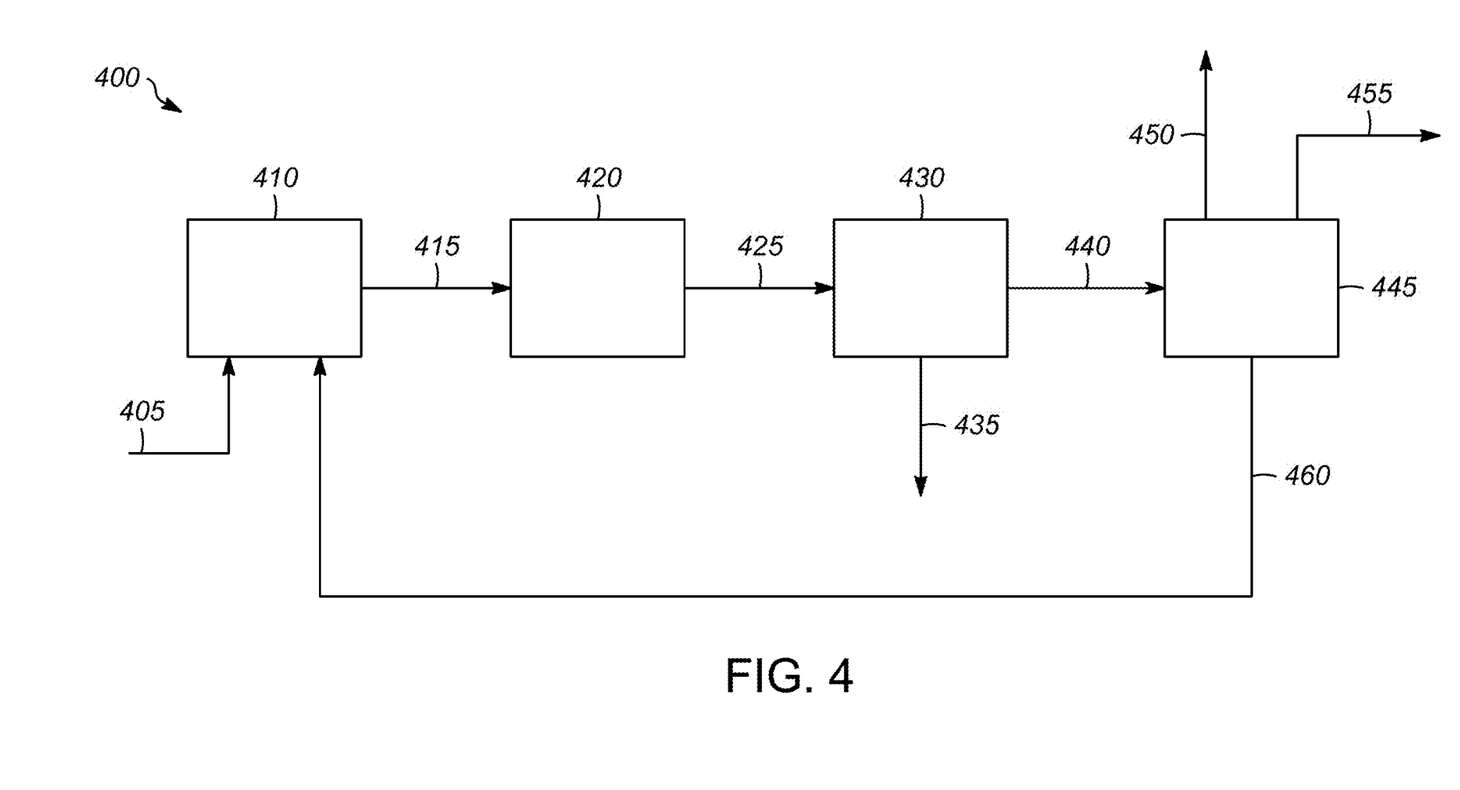
FIG. 4 is an illustration of another embodiment of a process of producing a hydrogen stream and a $CO_2$ stream from a hydrogen production process unit of the present invention.

FIG. 4 is an illustration of a process 400 for producing a hydrogen-enriched gas stream in which the carbon dioxide separation takes place before the hydrogen separation. The feed stream 405 is introduced into the hydrogen production process unit 410 where it is converted into synthesis gas. The synthesis gas mixture comprises hydrogen, carbon monoxide, methane, water, and inert gas.

The synthesis gas stream 415 comprising the synthesis gas mixture is sent to the water gas shift reactor 420 to convert carbon monoxide to carbon dioxide.

The shifted synthesis gas stream 425 is sent to the carbon dioxide recovery unit 430 where it is separated into a carbon dioxide product stream 435 and a carbon dioxide-depleted stream 440. The carbon dioxide product stream 435 is recovered.

The carbon dioxide-depleted stream 440 is sent to the hydrogen PSA system 445 where it is separated into high-pressure hydrogen product stream 450, an inert gas-enriched off gas stream 455, and a carbon-enriched off gas stream 460. The high-pressure hydrogen product stream 450 is recovered. The inert gas-enriched off gas stream 455 can be sent to be used as fuel in the hydrogen production process unit or elsewhere. The carbon-enriched off gas stream 460, which is enriched in carbon monoxide and methane, is recycled to the hydrogen production process unit 410.

Figure 5:
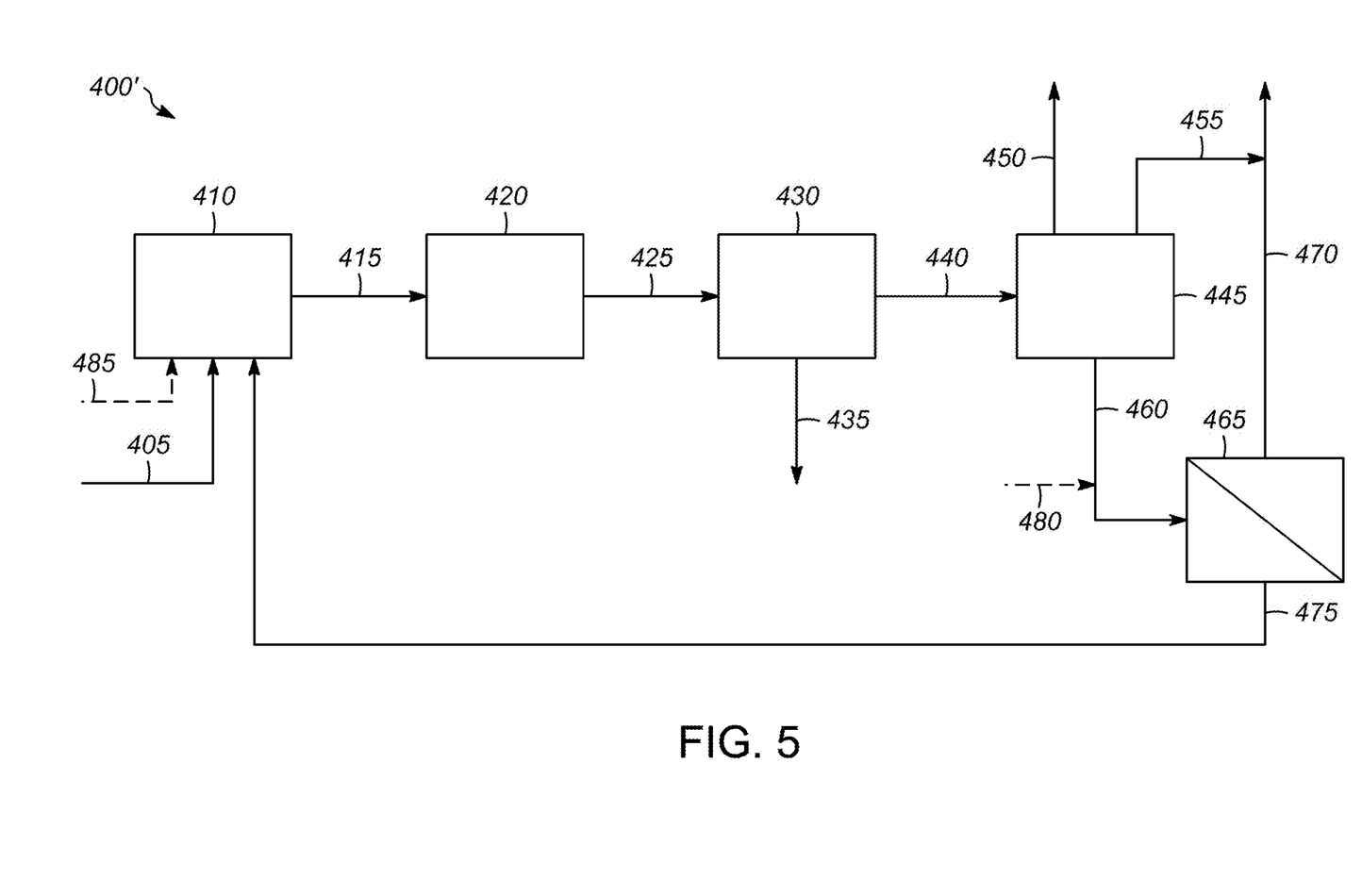
FIG. 5 is an illustration of another embodiment of the process of FIG. 4.

FIG. 5 illustrates a process 400' in which the carbon-enriched off gas stream 460 undergoes further separation.

The carbon-enriched off gas stream 460 is sent to a membrane separation unit 465 where it is separated into a permeate stream 470 enriched in hydrogen and a residue stream 475 enriched in carbon monoxide and methane. The permeate stream 470 can optionally be combined with the inert gas-enriched off gas stream 455. The residue stream 475 is recycled to the hydrogen production process unit 410.

If the hydrogen production process is integrated with a bio-renewable conversion process for making a hydrocarbon product from a bio-renewable feedstock, a purge gas stream 480 comprising hydrogen from a bio-renewable conversion process can be introduced into the membrane separation unit 465. Additionally, a hydrocarbon-containing stream 485 from the bio-renewable conversion process (not shown) can be used as at least a portion of the feed to the hydrogen production process unit 410.

EXAMPLE

A computer simulation was performed for a steam reforming hydrogen production process according to the embodiment in FIG. 3. The feeds stream 305 to this steam reformer was natural gas and a hydrocarbon-containing stream 385 (e.g., naphtha) from a bio-renewable process. In addition, a hydrogen containing purge gas stream 380 from a bio-renewable process was combined with the carbon-enriched off gas stream 360 to a membrane separation unit 365. An inert component (nitrogen) was contained in the natural gas feed stream 305.

The design of the system was optimized for maximum hydrogen and $CO_2$ recovery with minimal $CO_2$ emissions from the process by recycling residue stream 375 enriched in carbon monoxide and methane to the hydrogen production unit (e.g., steam reforming reactor) 310. The results are shown below in Table 1. Comparing the inert gas-enriched off gas stream 340 with shifted synthesis gas stream 325, we see that 38 of the nitrogen in the shifted synthesis gas stream 325 is rejected in the off gas stream 340, compared to only 0.5 of the carbon monoxide in the shifted syngas and only 0.7% of the methane in the shifted syngas. Furthermore, the membrane separation unit 365 selectively removes hydrogen from the recycle loop and produces a residue stream 375 enriched in carbon monoxide and methane.

TABLE 1

| Stream # | 325 | 335 | 355 | 380 | 340 | 370 | 375 |
| --- | --- | --- | --- | --- | --- | --- | --- |
| Description | Shifted Syngas | H2 Product | CO2 Product | Bio Purge Gas | Off Gas | Permeate | Residue |
| Molar Flow, kgmol/hr | 3290 | 2008 | 726.5 | 418.1 | 205.6 | 596.1 | 178.1 |
| Pressure, bar(g) | 22.4 | 21.5 | 138 | 36.3 | 1.5 | 1.5 | 35.4 |
| Temperature, oC | 42 | 50 | 17 | 50 | 40 | 65 | 70 |
| Composition, mol % | | | | | | | |
| Hydrogen | 73.82 | 99.9 | 0.00 | 85.20 | 93.91 | 96.84 | 15.73 |
| CO | 1.61 | <20 ppmv | <1000 ppmv | 1.14 | 0.12 | 1.03 | 28.19 |
| CO2 | 21.88 | <1 ppmv | 99.0 | 2.66 | 0.00 | 1.11 | 2.78 |
| Water | 0.39 | 0.00 | <100 ppmv | 0.23 | 0.00 | 0.16 | 0.00 |
| Methane | 1.34 | <100 ppmv | 0.90 | 2.10 | 0.15 | 0.53 | 24.43 |
| Ethane | 0.00 | 0.00 | 0.00 | 0.82 | 0.00 | 0.01 | 1.88 |

TABLE 1-continued

| Stream # | 325 | 335 | 355 | 380 | 340 | 370 | 375 |
|---|---|---|---|---|---|---|---|
| Propane | 0.00 | 0.00 | 0.00 | 7.06 | 0.00 | 0.07 | 16.34 |
| C4+ | 0.00 | 0.00 | 0.00 | 0.72 | 0.00 | 0.00 | 1.69 |
| Nitrogen | 0.96 | <1000 ppmv | 0.00 | 0.07 | 5.82 | 0.25 | 8.96 |
| Total | 100.00 | 100.00 | 100.00 | 100.00 | 100.00 | 100.00 | 100.00 |

Specific Embodiments

While the following is described in conjunction with specific embodiments, it will be understood that this description is intended to illustrate and not limit the scope of the preceding description and the appended claims.

A first embodiment of the invention is a process for producing a hydrogen-enriched gas stream comprising processing a feed stream comprising hydrocarbons or a carbonaceous feedstock in a hydrogen production process unit to produce a synthesis gas mixture comprising hydrogen, carbon monoxide, methane, water, and an inert gas; performing a water-gas-shift process on the synthesis gas mixture to form shifted synthesis gas comprising carbon dioxide; performing a hydrogen pressure swing adsorption (PSA) separation process and a carbon dioxide separation process on the shifted synthesis gas to form a high-pressure hydrogen product stream comprising the hydrogen, an inert gas-enriched off gas stream from the hydrogen separation process comprising the inert gas and depleted of carbon-containing components, a carbon dioxide product stream comprising carbon dioxide, and a carbon-enriched off gas stream comprising the carbon monoxide and the methane, the hydrogen PSA process comprising a three-product PSA system comprising a three-product PSA unit or at least two PSA units; and recycling the carbon-enriched off gas stream to the hydrogen production process unit. An embodiment of the invention is one, any or all of prior embodiments in this paragraph up through the first embodiment in this paragraph wherein performing the hydrogen PSA separation process and the carbon dioxide separation process comprises introducing the shifted synthesis gas into the three-product PSA to form the high-pressure hydrogen product stream, the inert gas-enriched off gas stream, and a hydrogen-depleted tail gas stream; and introducing the hydrogen depleted tail gas stream into a carbon dioxide recovery to form the carbon dioxide product stream and the carbon-enriched off gas stream. An embodiment of the invention is one, any or all of prior embodiments in this paragraph up through the first embodiment in this paragraph wherein introducing the shifted synthesis gas into the three-product PSA system comprises introducing the shifted synthesis gas into the three-product PSA unit to form the high-pressure hydrogen product stream, the inert gas-enriched off gas stream, and the hydrogen-depleted tail gas stream. An embodiment of the invention is one, any or all of prior embodiments in this paragraph up through the first embodiment in this paragraph wherein introducing the shifted synthesis gas into the three-product PSA system comprises introducing the shifted synthesis gas into a first PSA unit to form a carbon component-enriched tail gas stream enriched in the carbon dioxide, the carbon monoxide, and the methane, and a hydrogen-enriched intermediate stream; introducing the hydrogen-enriched intermediate stream into a second PSA unit to form the high-pressure hydrogen product stream and the inert-enriched off gas stream; and introducing the carbon component-enriched tail gas stream into the carbon dioxide recovery. An embodiment of the invention is one, any or all of prior embodiments in this paragraph up through the first embodiment in this paragraph further comprising introducing the carbon-enriched off gas stream into a membrane separation unit to form a permeate stream enriched in hydrogen and a residue stream enriched in carbon monoxide and methane; optionally combining the permeate stream with the inert gas-enriched stream; and wherein recycling the carbon-enriched off gas stream to the hydrogen production process unit comprises recycling the residue stream to the hydrogen production process unit. An embodiment of the invention is one, any or all of prior embodiments in this paragraph up through the first embodiment in this paragraph further comprising introducing a purge gas stream comprising hydrogen from a bio-renewable conversion process for making a hydrocarbon product from a bio-renewable feedstock with the carbon-enriched off gas stream to the membrane separation unit. An embodiment of the invention is one, any or all of prior embodiments in this paragraph up through the first embodiment in this paragraph wherein performing the PSA separation process and the carbon dioxide separation process comprises introducing the shifted synthesis gas into a carbon dioxide recovery to form the carbon dioxide product stream and a carbon dioxide-depleted stream; introducing the carbon dioxide-depleted stream into the three product PSA to form the high-pressure hydrogen stream, the inert-enriched off gas stream, and the carbon-enriched off gas stream. An embodiment of the invention is one, any or all of prior embodiments in this paragraph up through the first embodiment in this paragraph wherein introducing the carbon dioxide-depleted stream into the three product PSA system comprises introducing the carbon dioxide-depleted stream into the three-product PSA unit to form the high-pressure hydrogen product stream, the inert gas-enriched off gas stream, and the carbon-enriched off gas stream. An embodiment of the invention is one, any or all of prior embodiments in this paragraph up through the first embodiment in this paragraph wherein introducing the carbon dioxide-depleted stream into the three product PSA system comprises introducing the carbon dioxide-depleted stream into a first PSA unit to form the carbon-enriched off gas stream, and a hydrogen-enriched intermediate stream; introducing the hydrogen-enriched intermediate stream into a second PSA unit to form the high-pressure hydrogen product stream and the inert-enriched off gas stream. An embodiment of the invention is one, any or all of prior embodiments in this paragraph up through the first embodiment in this paragraph further comprising introducing the carbon-enriched off gas stream into a membrane separation unit to form a permeate stream enriched in hydrogen and a residue stream enriched in carbon monoxide and methane; optionally combining the permeate stream with the inert gas-enriched stream; and wherein recycling the carbon-enriched off gas stream to the hydrogen production process unit comprises recycling the residue stream to the hydrogen production process unit. An embodiment of the invention is one, any or all of prior embodiments in this paragraph up through the first embodiment in this paragraph further comprising introducing a purge gas stream comprising hydrogen from a bio-renewable conversion process for making a hydrocarbon product from a bio-renewable feedstock with the carbon-enriched off gas stream to the membrane separation unit. An embodiment of the invention is one, any or all of prior embodiments in this paragraph up through the first embodiment in this paragraph wherein the hydrogen production process unit comprises a steam reforming unit with an optional gas heated reformer, or an autothermal reforming unit with an optional gas heated reformer, or a gasification unit, or a partial oxidation (POX) unit, or combinations thereof. An embodiment of the invention is one, any or all of prior embodiments in this paragraph up through the first embodiment in this paragraph wherein an amount of the carbon-enriched off gas stream that is recycled to the hydrogen production process unit comprises less than 80% of a total amount of the carbon-enriched off gas stream and the inert gas-enriched off gas stream. An embodiment of the invention is one, any or all of prior embodiments in this paragraph up through the first embodiment in this paragraph wherein the carbon dioxide recovery comprises an amine separation unit, or a cryogenic separation unit, or a carbon dioxide PSA unit, or combinations thereof. An embodiment of the invention is one, any or all of prior embodiments in this paragraph up through the first embodiment in this paragraph wherein at least a portion of the feed stream comprises a hydrocarbon-containing stream from a bio-renewable conversion process for making a hydrocarbon product from a bio-renewable feedstock.

A second embodiment of the invention is a process for producing a hydrogen-enriched gas stream comprising processing a feed stream comprising hydrocarbons or a carbonaceous feedstock in a hydrogen production process unit to produce a synthesis gas mixture comprising hydrogen, carbon monoxide, methane, water, and an inert gas; performing a water-gas-shift process on the synthesis gas mixture to form shifted synthesis gas comprising carbon dioxide; performing a hydrogen pressure swing adsorption (PSA) separation process and a carbon dioxide separation process on the shifted synthesis gas to form a high-pressure hydrogen product stream comprising the hydrogen, an inert gas-enriched off gas stream from the hydrogen separation process comprising the inert gas and depleted of carbon-containing components, a carbon dioxide product stream comprising carbon dioxide, and a carbon-enriched off gas stream comprising the carbon monoxide and the methane, the hydrogen PSA process comprising a three-product PSA system comprising a three-product PSA unit or at least two PSA units; and recycling the carbon-enriched off gas stream to the hydrogen production process unit; wherein the carbon dioxide recovery comprises an amine separation unit, or a cryogenic separation unit, or a carbon dioxide PSA unit, or combinations thereof; and wherein performing the hydrogen PSA separation process and the carbon dioxide separation process comprises introducing the shifted synthesis gas into the three-product PSA to form the high-pressure hydrogen product stream, the inert gas-enriched off gas stream, and a hydrogen depleted tail gas stream; and introducing the hydrogen depleted tail gas stream into a carbon dioxide recovery to form the carbon dioxide product stream and the carbon-enriched off gas stream; or introducing the shifted synthesis gas into the carbon dioxide recovery to form the carbon dioxide product stream and a carbon dioxide-depleted stream; and introducing the carbon dioxide-depleted stream into the three product PSA to form the high-pressure hydrogen stream, the inert-enriched off gas stream, and the carbon-enriched off gas stream. An embodiment of the invention is one, any or all of prior embodiments in this paragraph up through the second embodiment in this paragraph wherein performing the hydrogen PSA separation process and the carbon dioxide separation process comprises introducing the shifted synthesis gas into the three-product PSA to form the high-pressure hydrogen product stream, the inert gas-enriched off gas stream, and a hydrogen depleted tail gas stream; and introducing the hydrogen depleted tail gas stream into a carbon dioxide recovery to form the carbon dioxide product stream and the carbon-enriched off gas stream. An embodiment of the invention is one, any or all of prior embodiments in this paragraph up through the second embodiment in this paragraph further comprising introducing the carbon-enriched off gas stream into a membrane separation unit to form a permeate stream enriched in hydrogen and a residue stream enriched in carbon monoxide and methane; optionally combining the permeate stream with the inert gas-enriched stream; and wherein recycling the carbon-enriched off gas stream to the hydrogen production process unit comprises recycling the residue stream to the hydrogen production process unit. An embodiment of the invention is one, any or all of prior embodiments in this paragraph up through the second embodiment in this paragraph wherein performing the PSA separation process and the carbon dioxide separation process comprises introducing the shifted synthesis gas into the carbon dioxide recovery to form the carbon dioxide product stream and a carbon dioxide-depleted stream; and introducing the carbon dioxide-depleted stream into the three product PSA to form the high-pressure hydrogen stream, the inert-enriched off gas stream, and the carbon-enriched off gas stream. An embodiment of the invention is one, any or all of prior embodiments in this paragraph up through the second embodiment in this paragraph further comprising introducing the carbon-enriched off gas stream into a membrane separation unit to form a permeate stream enriched in hydrogen and a residue stream enriched in carbon monoxide and methane; optionally combining the permeate stream with the inert gas-enriched stream; and wherein recycling the carbon-enriched off gas stream to the hydrogen production process unit comprises recycling the residue stream to the hydrogen production process unit.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:
1. A process for producing a hydrogen-enriched gas stream comprising:
    processing a feed stream comprising hydrocarbons or a carbonaceous feedstock in a hydrogen production process unit to produce a synthesis gas mixture comprising hydrogen, carbon monoxide, methane, water, and an inert gas;

performing a water-gas-shift process on the synthesis gas mixture to form shifted synthesis gas comprising carbon dioxide;

performing a hydrogen pressure swing adsorption (PSA) separation process and a carbon dioxide separation process on the shifted synthesis gas to form a high-pressure hydrogen product stream comprising the hydrogen, an inert gas-enriched off gas stream from the hydrogen separation process comprising the inert gas and depleted of carbon-containing components, a carbon dioxide product stream comprising carbon dioxide, and a carbon-enriched off gas stream comprising the carbon monoxide and the methane, the hydrogen PSA process comprising a three-product PSA unit; and recycling the carbon-enriched off gas stream to the hydrogen production process unit.

2. The process of claim 1 wherein performing the hydrogen PSA separation process and the carbon dioxide separation process comprises:

introducing the shifted synthesis gas into the three-product PSA unit to form the high-pressure hydrogen product stream, the inert gas-enriched off gas stream, and a hydrogen-depleted tail gas stream; and introducing the hydrogen depleted tail gas stream into a carbon dioxide recovery system to form the carbon dioxide product stream and the carbon-enriched off gas stream.

3. The process of claim 2 further comprising:

introducing the carbon-enriched off gas stream into a membrane separation unit to form a permeate stream enriched in hydrogen and a residue stream enriched in carbon monoxide and methane;

optionally combining the permeate stream with the inert gas-enriched stream;

and wherein recycling the carbon-enriched off gas stream to the hydrogen production process unit comprises recycling the residue stream to the hydrogen production process unit.

4. The process of claim 3 further comprising:

introducing a purge gas stream comprising hydrogen from a bio-renewable conversion process for making a hydrocarbon product from a bio-renewable feedstock with the carbon-enriched off gas stream to the membrane separation unit.

5. The process of claim 1 wherein performing the PSA separation process and the carbon dioxide separation process comprises: introducing the shifted synthesis gas into a carbon dioxide recovery system to form the carbon dioxide product stream and a carbon dioxide-depleted stream; and introducing the carbon dioxide-depleted stream into the three product PSA unit to form the high-pressure hydrogen stream, the inert-enriched off gas stream, and the carbon-enriched off gas stream.

6. The process of claim 5 further comprising:

introducing the carbon-enriched off gas stream into a membrane separation unit to form a permeate stream enriched in hydrogen and a residue stream enriched in carbon monoxide and methane;

optionally combining the permeate stream with the inert gas-enriched stream; and wherein recycling the carbon-enriched off gas stream to the hydrogen production process unit comprises recycling the residue stream to the hydrogen production process unit.

7. The process of claim 6 further comprising:

introducing a purge gas stream comprising hydrogen from a bio-renewable conversion process for making a hydrocarbon product from a bio-renewable feedstock with the carbon-enriched off gas stream to the membrane separation unit.

8. The process of claim 1 wherein the hydrogen production process unit comprises a steam reforming unit with an optional gas heated reformer, or an autothermal reforming unit with an optional gas heated reformer, or a gasification unit, or a partial oxidation (POX) unit, or combinations thereof.

9. The process of claim 1 wherein an amount of the carbon-enriched off gas stream that is recycled to the hydrogen production process unit comprises less than 80% of a total amount of the carbon-enriched off gas stream and the inert gas-enriched off gas stream.

10. The process of claim 1 wherein the carbon dioxide recovery system comprises an amine separation unit, or a cryogenic separation unit, or a carbon dioxide PSA unit, or combinations thereof.

11. The process of claim 1 wherein at least a portion of the feed stream comprises a hydrocarbon-containing stream from a bio-renewable conversion process for making a hydrocarbon product from a bio-renewable feedstock.

12. A process for producing a hydrogen-enriched gas stream comprising:

processing a feed stream comprising hydrocarbons or a carbonaceous feedstock in a hydrogen production process unit to produce a synthesis gas mixture comprising hydrogen, carbon monoxide, methane, water, and an inert gas;

performing a water-gas-shift process on the synthesis gas mixture to form shifted synthesis gas comprising carbon dioxide;

performing a hydrogen pressure swing adsorption (PSA) separation process and a carbon dioxide separation process on the shifted synthesis gas to form a high-pressure hydrogen product stream comprising the hydrogen, an inert gas-enriched off gas stream from the hydrogen separation process comprising the inert gas and depleted of carbon-containing components, a carbon dioxide product stream comprising carbon dioxide, and a carbon-enriched off gas stream comprising the carbon monoxide and the methane, the hydrogen PSA process comprising a three-product PSA unit;

introducing the carbon-enriched off gas stream into a membrane separation unit to form a permeate stream enriched in hydrogen and a residue stream enriched in carbon monoxide and methane; and recycling the residue stream to the hydrogen production process unit;

wherein the carbon dioxide recovery system comprises an amine separation unit, or a cryogenic separation unit, or a carbon dioxide PSA unit, or combinations thereof; and wherein performing the hydrogen PSA separation process and the carbon dioxide separation process comprises:

introducing the shifted synthesis gas into the three-product PSA unit to form the high-pressure hydrogen product stream, the inert gas-enriched off gas stream, and a hydrogen depleted tail gas stream; and introducing the hydrogen depleted tail gas stream into a carbon dioxide recovery system to form the carbon dioxide product stream and the carbon-enriched off gas stream;

or introducing the shifted synthesis gas into the carbon dioxide recovery system to form the carbon dioxide product stream and a carbon dioxide-depleted stream; and introducing the carbon dioxide-depleted stream into the three product PSA unit to form the high-pressure hydrogen stream, the inert-enriched off gas stream, and the carbon-enriched off gas stream.

13. The process of claim 12 wherein performing the hydrogen PSA separation process and the carbon dioxide separation process comprises:

introducing the shifted synthesis gas into the three-product PSA unit to form the high-pressure hydrogen product stream, the inert gas-enriched off gas stream, and a hydrogen depleted tail gas stream; and introducing the hydrogen depleted tail gas stream into a carbon dioxide recovery system to form the carbon dioxide product stream and the carbon-enriched off gas stream.

14. The process of claim 12 wherein performing the PSA separation process and the carbon dioxide separation process comprises:

introducing the shifted synthesis gas into the carbon dioxide recovery system to form the carbon dioxide product stream and a carbon dioxide-depleted stream; and introducing the carbon dioxide-depleted stream into the three product PSA unit to form the high-pressure hydrogen stream, the inert-enriched off gas stream, and the carbon-enriched off gas stream.

* * * * *